United States Patent [19]
Lu et al.

[11] Patent Number: 5,504,524
[45] Date of Patent: Apr. 2, 1996

[54] METHOD AND APPARATUS FOR CONTROLLING COLOR BALANCE OF A VIDEO SIGNAL

[75] Inventors: Mingying Lu; Peter B. Denyer, both of Edinburgh, Scotland

[73] Assignee: VLSI Vision Limited, Edinburgh, Scotland

[21] Appl. No.: 322,431

[22] Filed: Oct. 13, 1994

[51] Int. Cl.$^6$ .................................................. H04N 9/73
[52] U.S. Cl. ......................... 348/223; 348/225; 348/655
[58] Field of Search ................................. 348/223, 225, 348/655; 358/29, 29 C; H04N 9/73, 9/73 C, 9/73 R

[56] References Cited

U.S. PATENT DOCUMENTS

| | | |
|---|---|---|
| 5,027,217 | 6/1991 | Oshio et al. . |
| 5,038,205 | 8/1991 | Kondo ..................................... 348/225 |
| 5,260,774 | 11/1993 | Takayama ............................... 348/655 |

FOREIGN PATENT DOCUMENTS

| | | |
|---|---|---|
| 2538652 | 12/1982 | France . |
| 63-242090 | 10/1988 | Japan . |
| 2-63295 | 3/1990 | Japan . |
| 2194792 | 8/1990 | Japan . |
| WO93/04556 | 4/1993 | United Kingdom . |

OTHER PUBLICATIONS

Proceedings of the IEEE 1990 Custom Integrated Circuits Conference 16 May 1990, Boston US pp. 731–734 Renshaw D. 'ASIC Vision'.

*Primary Examiner*—James J. Groody
*Assistant Examiner*—Sherrie Hsia
*Attorney, Agent, or Firm*—Bell, Seltzer, Park & Gibson

[57] ABSTRACT

A method of controlling the colour balance of a video signal which comprises green, red and blue channel singals. Pixels are identified which have a green intensity within a peak intensity band. For these pixels, the red and blue intensities are examined to identify pixel subsets which are within respective red and blue peak bands. If the red and or blue peak bands are greater than the green peak band the gain of the red and/or blue channel(s) is increased. If the red and/or blue peak bands are lower than the green peak band, red and/or blue peak bands are determined for the entire video frame and are compared with the green peak band. If the red and/or blue peak bands for the entire frame are lower than that for the green channel, the gain of the red and/or blue channel(s) is increased.

19 Claims, 4 Drawing Sheets

METHOD AND APPARATUS FOR CONTROLLING COLOR BALANCE OF A VIDEO SIGNAL

BACKGROUND OF THE INVENTION

The present invention relates to methods of colour balance and means for use in colour balance in colour video cameras and display systems.

In colour video systems, colour balance is a critical factor in perceived image quality. Colour balance is the process of weighting the individual colour channels of a composite colour system, e.g. red, green, blue (R, G, B) to achieve the greatest fidelity of the image compared to the original scene. Normally the key objective of colour balance is for a white object to be imaged with equal energies in R, G, B. This is conventionally achieved by methods and apparatus based on white colour luminance which is widely and successfully used in modern cameras.

In general this conventional approach uses a separate white balance sensor containing relatively few pixels which receives diffused light through a white diffuser direct from the field of view so as to provide what would be expected to be a white image. Any deviation from a white output, i.e. with substantially equal red, green, and blue signal levels, from this white balance sensor is then corrected by adjusting the individual channel gains. The corresponding channel gain adjustments are then applied to the main image sensor.

This system does however have the disadvantages of requiring a separate additional sensor, associated processing means, and means for transferring colour balance information to the main image sensor output. These in turn result in additional manufacturing complexity and cost.

It is an object of the present invention to avoid or minimize one or more of the above disadvantages.

We have found that colour balance can be successfully achieved by a new approach using highlight areas in the green signal. This is particularly effective as maximum green signal levels occur in a number of different principal highlight colours viz white, yellow, cyan and green. Red and blue peak signal levels are also monitored at areas of the image where green is at its peak level. The monitored red and blue peak levels are compared with the green peak level. If any red or blue peak levels are greater than the corresponding green peak levels in an image, then the image is judged to be imbalanced and the gain of the imbalanced red or blue channel is decreased until the difference is substantially eliminated. Because the technique has been extended to be able to judge colour balance on scenes from white to yellow, as well as cyan and green, the monitored lower peak level of the red or blue channels may not represent their real peak level in the image: for example, the blue peak in a yellow image highlight and the red in a cyan highlight. The lower peak level could be caused either by colour imbalance or by a shortage of that colour in the scene.

To solve this further problem the monitoring area for red and blue peak values may be extended over the whole image rather than just at the green highlights. This measurement will then have much higher probability of representing correct peak colour levels in the image so that the gain can be increased until the monitored peak level for each colour becomes substantially equal to the green peak level.

These techniques can be used to realise a real time digital auto-colour balance controller by monitoring the three colour channels without the need for the secondary apparatus or data handling means as required by conventional white luminance colour balance systems thereby facilitating a simple and/or more economic form of manufacture.

It will also be understood that the present invention is not restricted to the RGB system but may also be used in other composite colour systems having a first colour predominantly associated with or characteristic of highlight areas and at least two further colours, e.g. the Cyan, Magenta, Yellow colour system in which the yellow colour is considered to be characteristic of highlight areas.

SUMMARY OF THE INVENTION

According to a first aspect of the present invention there is provided a method of controlling the colour balance of a video signal comprising a highlight colour channel and at least two secondary colour channels and corresponding to a video image frame defined over an array of pixels, the method comprising the steps of:

determining for the highlight colour a first peak intensity band containing a first plurality of pixels, wherein the pixels within the band correspond to highlight areas of the image;

determining for at least one of the secondary colours, from the highlight areas, a second peak intensity band containing a second plurality of pixels; and comparing the first peak intensity band determined for the highlight colour with the second peak intensity band determined for said at least one secondary colour and altering the gain of its secondary colour channel to reduce the intensity difference between these two peak intensity bands.

According to a second aspect of the present invention there is provided a colour balance controller for controlling the colour balance of a colour video signal output by an image sensor corresponding to a video image frame defined by an array of pixels, the controller comprising:

an input for receiving at least three colour channels of a colour vide signal, the channels including a highlight colour channel and at least two secondary colour channels;

means for defining a plurality of pixel intensity bands for the signal on each colour channel;

first assignment means for assigning each pixel of an image frame into one of said bands according to the intensity of the highlight colour;

means for determining for the highlight colour a first peak intensity band containing a first plurality of pixels, wherein the pixels within this band correspond to highlight areas of the image;

second assignment means for assigning said first plurality of pixels within the highlight colour peak band into respective intensity bands according to the intensity of a first of the secondary colours;

means for determining for the secondary colour a peak intensity band containing a second plurality of pixels; and comparator means coupled to the first and second assignment means for comparing the highlight colour peak intensity band and the secondary colour peak intensity band; and gain control means for adjusting automatically the gain of said first secondary colour channel in dependence upon the result of the comparison so as to reduce the intensity difference between the two peak intensity bands.

According to a third aspect of the present invention there is provided a method of controlling the colour balance of a composite colour video image having at least three colour channels with a first colour characteristic of typical highlight areas, and at least two secondary colours, said method comprising the steps of:

monitoring the output of the individual colour channels of the image sensor;

recording the highlight colour peak signal level (Gpw) of a highlight colour peak band containing the output of at least several pixels;

recording for at least one of the secondary colours the peak signal levels (Rp and/or Bp) of secondary colour peak bands, each containing the output of at least several pixels, within image highlight areas having highlight colour signal levels corresponding substantially to said recorded highlight colour peak signal level;

comparing the recorded highlight secondary peak signal level(s) with the recorded highlight colour peak signal level and altering the corresponding channel gain(s) so as to reduce any difference between highlight area secondary colour peak signal level(s) and the recorded highlight colour peak signal level.

According to a fourth aspect of the present invention there is provided a method of controlling the colour balance of a composite colour video image having at least three colour channels with a first colour characteristic of typical highlight areas, and at least two secondary colours, said method comprising the steps of:

monitoring the output of the individual colour channels of the image sensor;

recording the highlight colour peak signal level (Gpw) of a highlight colour peak band containing the output of at least several pixels;

recording first secondary colour peak signal levels (Rp, Bp) of respective secondary colour peak bands, each containing the output of at least several pixels, within image areas having highlight colour signal levels corresponding substantially to said recorded highlight colour peak signal level;

recording second whole image secondary colour peak signal levels (Rpw, Bpw) of respective secondary colour peak bands each containing the output of at least several pixels, across substantially the whole image;

comparing the recorded highlight secondary colour peak signal levels with the recorded highlight colour peak signal level and, in the case of highlight area secondary colour peak signal levels greater than the recorded highlight colour peak signal level, decreasing the respective channel gains substantially to the recorded highlight colour peak signal level or, in the case of highlight area secondary colour peak signal levels less than the recorded highlight colour peak signal level, comparing the recorded whole image secondary colour peak signal levels with the recorded highlight colour peak signal level and increasing the respective channel gains in the case of whole image secondary colour peak signal levels less than the recorded highlight colour peak signal level substantially to the recorded highlight colour peak signal level.

It should further be noted that if it is not essential to provide an exact colour balance (subjectively good colour balance can generally be achieved with an imbalance tolerance of up to 6% or thereabouts) there is no necessity for an analog-digital converter as is required in conventional image processing. Monitoring of signal levels may be carried out using a relatively simple system of a small plurality of comparators, conveniently at least four, to divide the upper signal range of images into a small plurality of bands. Thus, for example, with a system using four comparators for each colour channel, working at the image sensor pixel clock rate, the output signal range is divided into five bands.

In order to achieve a balanced image for all colours and most of the luminance range the three channels' output signal ranges all have to be limited to a linear region of the sensor output amplifier. This in turn can be readily achieved by an automatic exposure (or brightness) control system based on the use of such comparators.

The exposure controllers monitors the output stream of the comparators on the three colour channels at the same time. Two groups of signals are maintained. One group monitors each of the three channels with a reference level of V3 and the other group uses a reference level V2, where V3 and V2 are the threshold levels for band 2 and band 3 of the above described five band system with output signal voltage bands 0, 1 and 2 covering the linear range of operation of the image sensor. The output of the three comparators in each group are combined by an OR gate to give a net judgement. Any pixel which contains any colour component which exceeds V3 is counted in N(1) as an over-exposed (or over-bright) pixel. Any pixel which contains any colour primary component (red, green or blue in an RGB system) which exceeds V2, but does not exceed V3, is counted in N(2) as a well exposed (or good-brightness) pixel. According to the values of the counts N(1) and N(2), it is judged that if N(1)>1% of the total number of pixels in the image sensor the image is over-exposed (or over-bright) and if N(2)<1% then the image is under-exposed (or under-bright). The exposure controller than activates a suitable exposure brightness control system, e.g. one which varies the pixel sensing integration time, to adjust the exposure (or brightness) for the next image.

Where such an exposure (or brightness) controller is used, it is usually arranged to take priority over the colour balance controller. Only when the exposure (or brightness) exhibits the right conditions as judged by the exposure (or brightness) algorithm does the colour balance controller start to adjust the colour balance.

The exposure (or brightness) controller first brings the peak signal of images into a suitable band (band 2), then the colour balance controller adjusts the secondary colour channel gains individually. The two controllers work iteratively until both exposure (or brightness) and colour balance attain the right condition.

According to a fifth aspect of the present invention there is provided a method of controlling the colour balance of a composite colour video image having at least three colour channels with a first colour characteristic of typical highlight areas, and at least two secondary colours, said method comprising the steps of:

monitoring the output of the individual colour channels of the image sensor;

recording the highlight colour peak signal level (Gpw) of a highlight colour peak band containing the output of at least several pixels;

recording for at least one of the secondary colours the peak signal levels (Rp and/or Bp) of secondary colour peak bands, each containing the output of at least several pixels, within image highlight areas having highlight colour signal levels corresponding substantially to said recorded highlight colour peak signal level;

comparing the recorded highlight secondary peak signal level(s) with the recorded highlight colour peak signal level and altering the corresponding channel gain so as to reduce any difference between highlight area secondary colour peak signal level(s) and the recorded highlight colour peak signal level.

According to a sixth aspect of the present invention there is provided a colour balance controller suitable for use in controlling the colour balance of colour video systems in real time using a method of the present invention, which controller comprises:

monitoring means formed and arranged for monitoring the output signal levels of the individual colour channels of the image sensor in use of the sensor;

first temporary data storage means for recording the highlight colour peak signal level of a highlight colour peak band containing the output of at least several pixels;

secondary temporary data storage means for recording first, highlight area, secondary colour peak signal levels of respective secondary colour peak bands each containing the output of at least several pixels, within image areas having highlight colour signal levels corresponding substantially to said recorded highlight colour peak signal level;

third temporary data storage means for recording second, whole image, secondary colour peak signal levels of respective secondary colour peak bands each containing the output of at least several pixels, across substantially the whole image; and processor means formed and arranged for comparing the recorded highlight area secondary colour peak signal levels with the recorded highlight colour peak signal level and providing gain control signals for decreasing the respective channel gains in the case of highlight area secondary colour peak signal levels greater than the recorded highlight colour peak signal level, substantially to the recorded highlight colour peak signal level and, in the case of highlight secondary colour peak signal levels less than the recorded highlight peak signal level, comparing the recorded whole image secondary colour peak signal levels with the recorded highlight colour peak signal level and providing gain control signals for increasing the respective channel gains in the case of whole image secondary colour peak signal levels less than the recorded highlight colour peak signal level, substantially to the recorded highlight colour peak signal level.

The controller may be implemented in hardware or in software or in a combination of hardware and software.

Whilst the processor could be formed and arranged for providing gain control signals for providing predetermined gain increments and/or decrements and achieving "correct" balancing by an iterative process, preferably the processor means is further formed and arranged for calculating gain increments and/or decrements corresponding substantially to the imbalance determined from the above mentioned signal comparisons.

According to a seventh aspect of the present invention there is provided a video applicance having a colour balance controller according to any one of the above aspects of the invention.

In further aspects the present invention provides an image sensor in combination with a colour balance controller of the present invention, and a colour video camera wherein the image sensor is provided with a colour balance controller of the present invention. Advantageously the colour balance controller is provided on the same Integrated Circuit as the image sensor array and pixel data and image processing means. Conveniently the colour balance controller is provided in an Integrated Circuit such as that described in our earlier Patent Publication No. WO91/04633.

Further preferred features and advantages of the invention will appear from the following detailed description given by way of example of a preferred embodiment illustrated with reference to the accompanying drawings in which:

DETAILED DESCRIPTION OF THE PREFERRED EMBODIMENT

Figure 1:
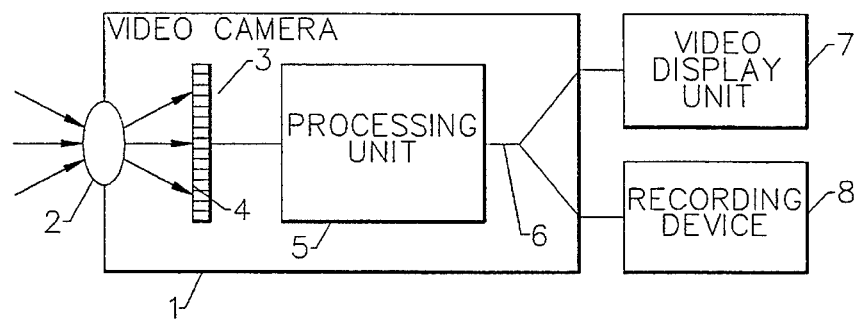
FIG. 1 shows a schematic representation of a video camera having a colour balance system.

There is shown in FIG. 1 a video camera 1 comprising a lens 2 which is arranged to focus an image onto an image detector 3 which comprises a large array of sensors. Each sensor of the detector corresponds to a pixel of an image frame produced by the video camera. The image detector is coupled to a processing unit 5 which receives a stream of pixel data from the image detector as the image detector is scanned. The processing unit 5 provides a video output signal 6 for coupling to a video display unit 7 and/or a recording device 8.

Figure 2:
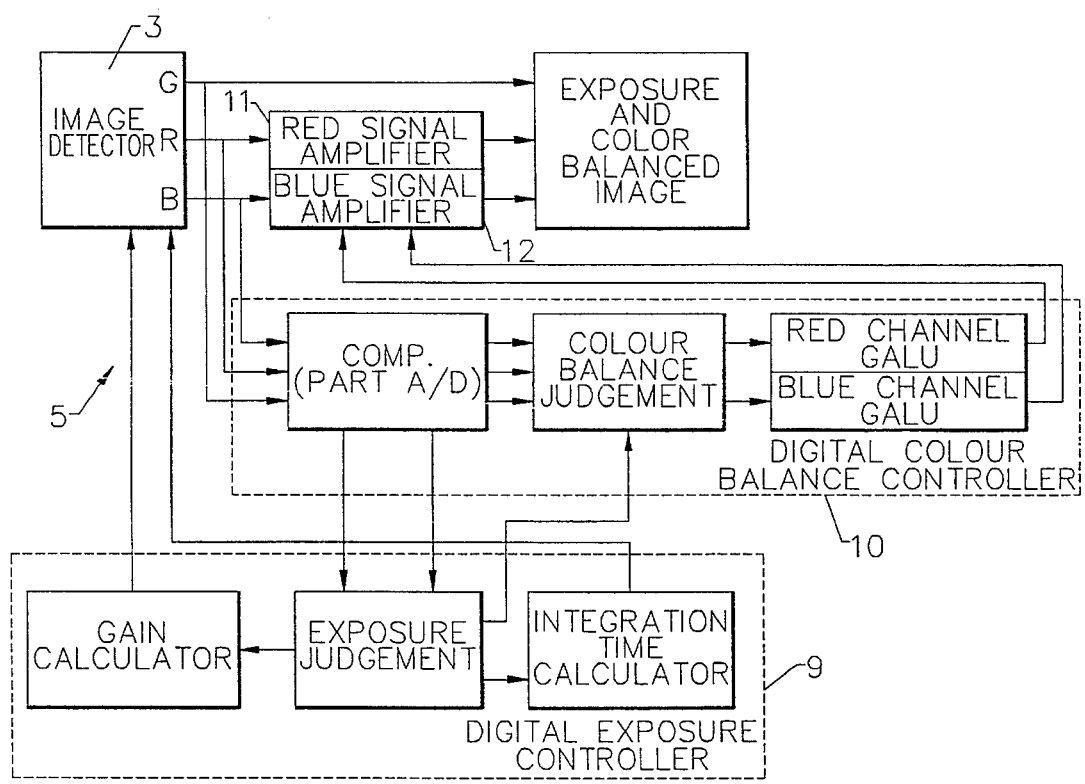
FIG. 2 shows an exposure and colour balance controller of the camera of FIG. 1.

FIG. 2 shows a schematic diagram of a processing unit 5 which is suitable for use in the video camera of FIG. 1 and which enables digital colour balancing and exposure to be carried out in real-time. In particular, the processing unit comprises a digital exposure controller 9 which is arranged to scan the intensity of pixels of an image frame and to calculate therefrom an appropriate sensor integration time (i.e. that time for which the elements of the sensor array are exposed to light before being sampled) and an overall gain factor to ensure correct exposure. The processing unit also comprises a digital colour balance controller 10 which also scans the pixels of a captured image in order to correctly balance the three colour channels, i.e. red, blue and green. Colour balance is achieved by comparing the green channel intensity of certain pixels of the image with the red and blue channel intensities of image pixels and by varying the gain of the red and blue channel signal amplifiers 11, 12 accordingly to equalise the three colour channels.

Figure 3:
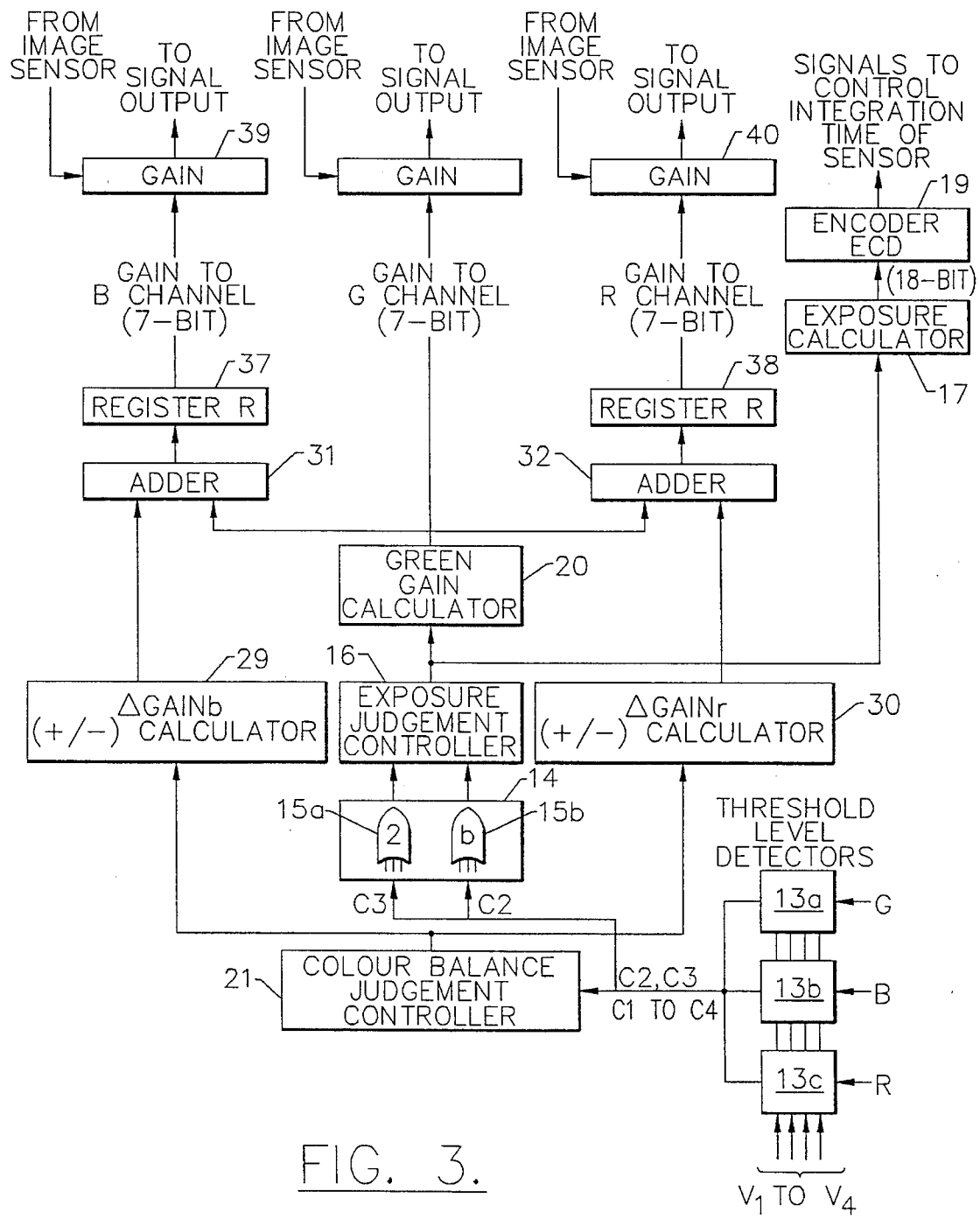
FIG. 3 shows hardware circuitry for implementing the controller of FIG. 2.
Figure 4:
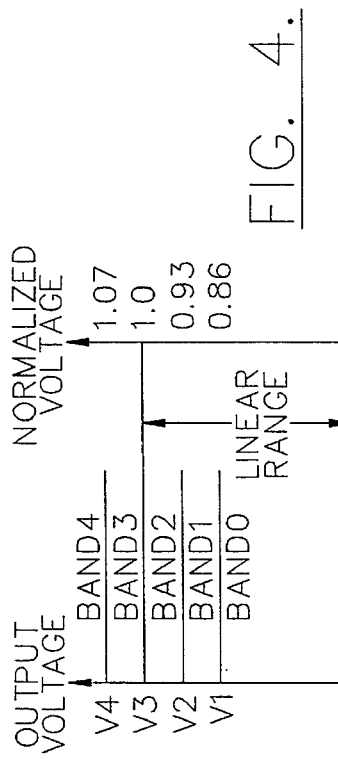
FIG. 4 shows intensity level bands used in the circuitry of FIG. 3.

FIG. 3 shows in detail a hardware arrangement for implementing the colour balance and exposure controller of FIG. 2. The controller receives separate green, blue and red colour channel signals and these are supplied to respective threshold level detectors 13a to 13c. Each of the threshold level detectors comprises four comparators which are arranged to compare the received signal against one of four threshold levels V1 to V4. These levels are indicated in FIG. 4 which illustrates that the threshold levels define (together with a zero level V0) five intensity bands B0 to B5. The four threshold levels are selected such that the colour channels providing a voltage greater than V3 are considered to be over-exposed whilst colour channels providing a level less than V2 are considered to be under-exposed.

Each of the threshold level detectors provides four output signals C1 to C4 corresponding to the outputs of the corresponding comparators. The results of the V2 and V3 comparisons, C2 and C3, are supplied to a combining means 14 which comprises two, three- input, logical OR gates 15a, 15b. A first of the OR gates 15a is arranged to OR the results of three V3 comparisons such that, if any one of these comparisons results in a high output (indicating that the particular colour channel intensity exceeds V3), the output of the OR gate is high. Similarly, the second OR gate 15b is arranged to OR together the results of the V2 comparisons and outputs a high signal if any one of these comparisons is high. The outputs from the two OR gates are supplied to an exposure judgement controller 16 which maintains a count N(1) of pixels having at least one colour channel exceeding the threshold level V3. The exposure judgement controller also maintains a count N(2) of pixels having a least one colour channel which exceeds the threshold V2 but which does not exceed the threshold level V3.

Following the scanning of a complete image frame, the exposure controller 16 is arranged to determine if N(1)>1% or if N(2)<1% and to send a signal indicating over-exposure or under-exposure of the image frame respectively to an exposure calculator 17. The exposure calculator 17 increments or decrements a stored digital exposure value accordingly to provide a control signal suitable for input to an exposure control device 19 which may be electro-mechanical, e.g. iris means, or more preferably is electronic, e.g. based upon a variation of the sensor cell integration time as described in International Patent Publication No. WO93/04556. In the event that the ambient light conditions are such that a satisfactory exposure cannot be obtained within the operating limits of the exposure calculator 17, then additional control of the video image output signal is available by switching over at the limits of the exposure control device to adjustment of a green channel gain calculator 20.

Figure 5:
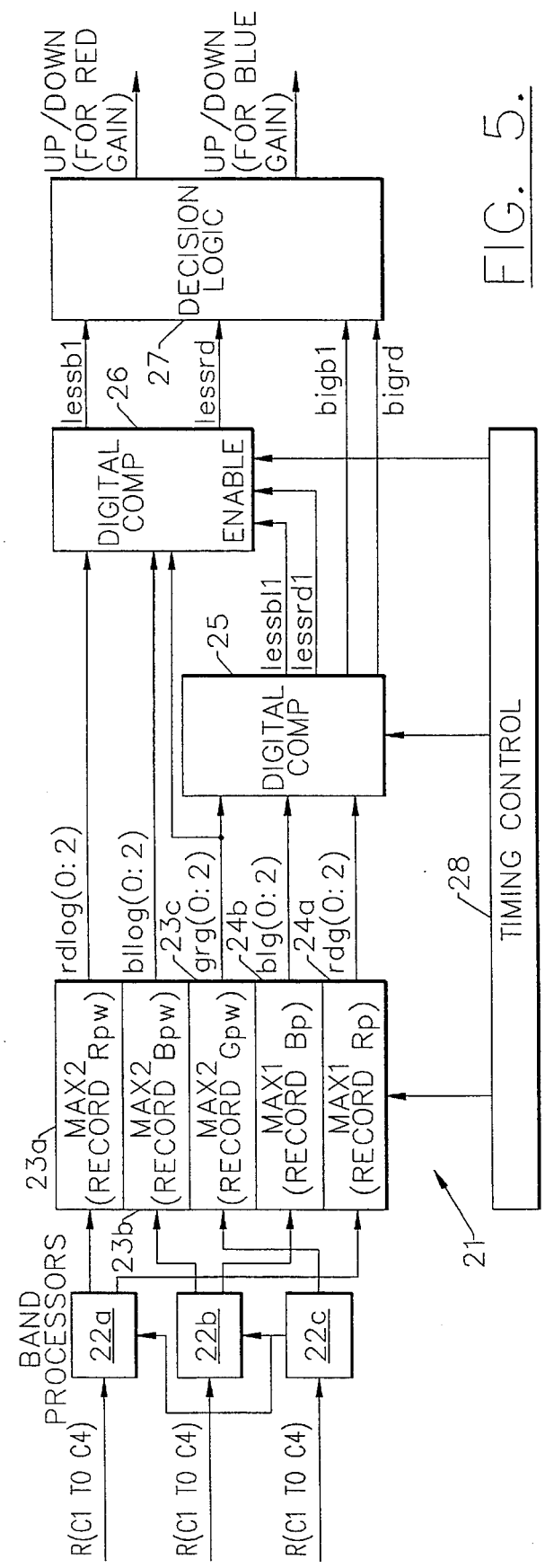
FIG. 5 shows in detail the colour balance controller of FIG. 3.

When a satisfactory exposure time has been determined, a colour balance controller 21 scans the outputs of the three threshold level detectors 13a to 13c in order to determine whether or not adjustment of the various colour channels are required in order to equalise the colour levels. FIG. 5 shows in detail the organisation of this colour balance controller 21. The output streams provided by the three threshold level detectors 13a to 13c are input to respective band processors 22a to 22c. During a first scan of the image frame, each of the band processors is arranged to create a histogram for the corresponding colour channel in which each of the pixels of the entire frame are assigned to one of the five bands B0 to B4. At the end of the scan, each of the processors determines which of the corresponding set of bands contain at least 64 pixels (this number is chosen to eliminate the effects of spurious high intensity pixels) and which of these bands is the highest. The band processors then write the determined band number B0, B1, B2, B3 or B4 to respective MAX2 stores 23a to 23c.

In FIG. 5, the peak green, red and blue bands are identified as Gpw, Rpw and Bpw respectively.

The band processor 22c which receives the green channel data is additionally arranged to store the locations of those pixels which are identified as lying the peak band Gpw and which constitute green highlights areas. Following a first scan of the image, these locations are passed to the red and blue channel band processors 22a, 22b which then proceed to identify the respective colour intensities at these pixels and to create a second pair of band intensity histograms for these green highlight areas. The red and blue channel band processors then identify respective peak bands for these green highlight areas. The results Rp, Bp are passed to respective MAX1 stores 24a, 24b.

The colour balance controller 21 further comprises two digital comparators 25, 26, which execute the comparisons of the various peak values stored in the MAX stores, decision logic 27 which generates gain control signals, and timing control means 28 which coordinates the operation of the colour balance controller.

The recorded peak band for the green channel Gpw and the peak bands for the red and blue channels in the green highlight areas Rp, Bp are passed in binary coded form to the first digital comparator 25 which determines whether or not the red and/or blue peak bands in the highlight areas are higher than the green peak band. If Rp or Bp are higher than Gpw then a signal is passed to the decision logic 27 which then provides control signals, for reducing the blue and/or red channel gain, to respective gain adjustment calculators 29, 30. If Rp and Bp are lower than Gpw then the second digital comparator 26 is enabled. This comparator receives the recorded peak values of the green, red and blue signals for the whole image Gpw, Rpw, Bpw in binary coded form and compares them against each other to determine whether or not the red and/or blue peak levels for the whole image are lower than the green peak level. If they are lower, then a signal is passed to the decision logic 27 which then provides control signals, for increasing the blue and/or red channel gain, to the respective channel gain adjustment calculators 29, 30.

As shown in FIG. 3, the blue and red channel gain adjustment calculators 29, 30 each provide their output to a corresponding adder 31, 32 to be combined with the gain level generated by the green gain calculator 20 which would normally be a set to a predetermined intermediate value (this value could be higher or lower under extreme lighting conditions outside the operation range of the exposure calculator 17 as explained hereinbefore). The output of the adders provides adjusted gain levels for the blue and red channels which are passed to respective registers 37, 38 which in turn provide control signals to respective blue and red channel gain means 39, 40.

Figure 6:
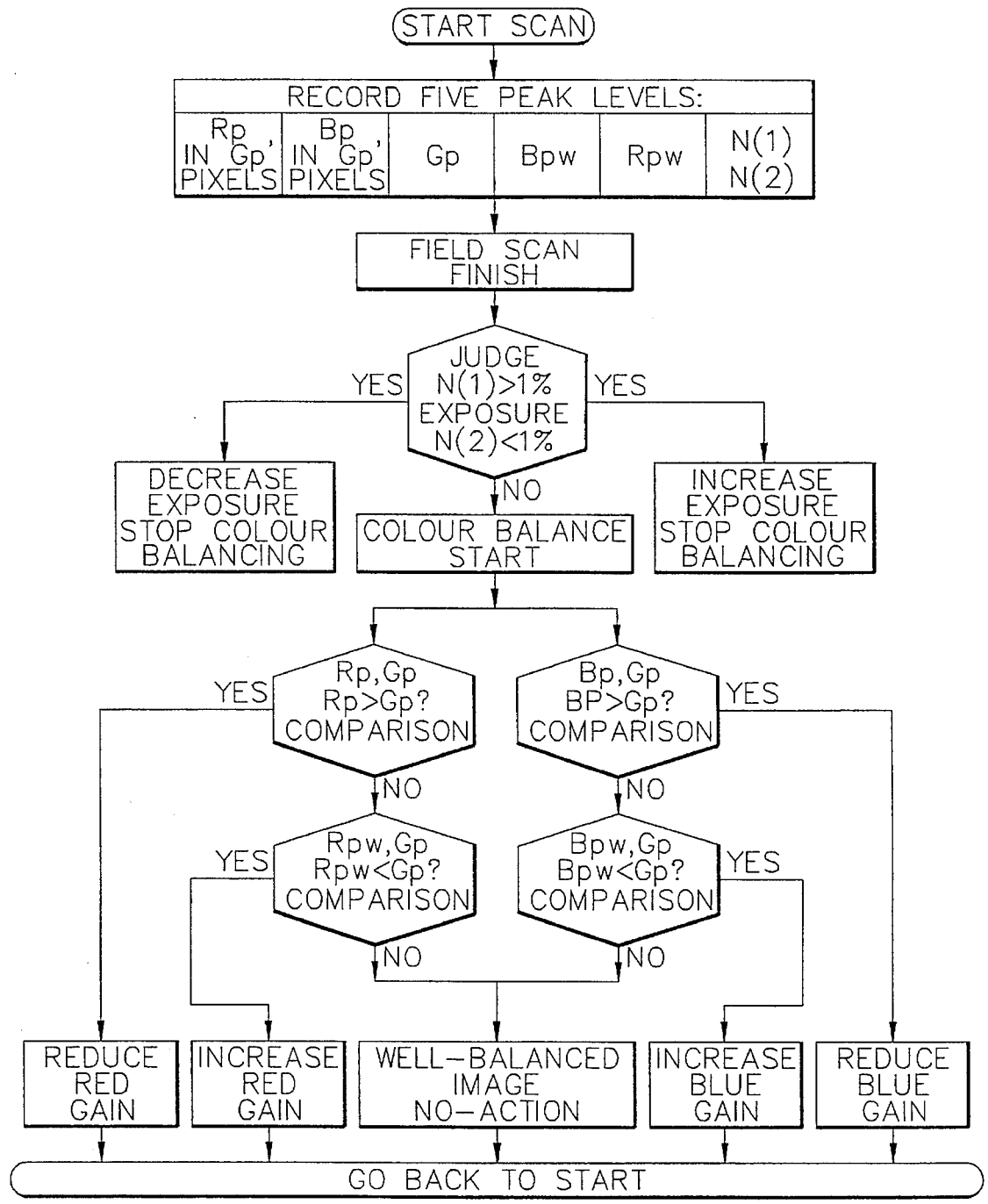
FIG. 6 shows a flow diagram of the operation of the circuit of FIGS. 3 and 5.

The operation of the colour balance system is further illustrated in FIG. 6. During the scanning of an image frame, the output of the green channel is monitored and Gpw (the highest output band containing at least 64 green pixels) is recorded. Rp (red peak band) and Bp (the blue peak band) are also recorded in the areas where the green pixel is in its peak band, i.e. green highlights. In addition red and blue peak bands Rpw and Bpw are recorded over the whole image using the same criterion for excluding noise as before. After the scan has finished, Rp and Bp (and if necessary Rpw and Bpw) are compared with Gpw separately and suitable gain control signals produced.

It will be apparent that no matter whether the highlight of an image is white, yellow or cyan, saturated or unsaturated, if an imbalanced image occurs the first step of the above described system reduces an over-strong response (red or blue). The next step is to increase weak responses. In this second step Rpw and Bpw are compared with Gpw once again. The gain of either channel which is not changed after the first comparison will be increased after the second comparison if the peak of the channel is lower than Gpw.

If the identified highlight area in the image is white, Rpw and Bpw will be given the same value as Rp and Bp. If the highlight is yellow, cyan or green (i.e. other than white) however, one or both of Rp and Bp may not be a real peak value in the whole image. Thus it is necessary to search within the whole image to help to find the proper Rpw and Bpw peak values. This is very useful in reducing the probability of incorrect action and makes the scheme work properly over a wide image range.

As noted above, anomalous colour balancing effects due to noise are minimised by monitoring for at least 64 pixels in the peak band. In other words, if less than 64 pixels are in the highest band, the "highest" band is ignored and Gpw value etc. is redefined to a lower band.

In this way the colour balance controller produces red and blue channel gain control signals which are supplied to blue and red channel gain calculators 29, 30 which increment or decrement respective red and blue channel gains according to the gain control signals.

It will be appreciated that various modifications may be made to the above described embodiment within the scope of the present invention. The controller described above may be used to control the colour balance of a video signal in any of an umber of appliances, for example a colour television, a satellite receiver or a video player/recorder.

We claim:

1. A method of controlling the colour balance of a video signal comprising a highlight colour channel for a highlight colour and at least two secondary colour channels for secondary colours and corresponding to a video image frame defined over an array of pixels, the method comprising the steps of:

determining for the highlight colour a first peak intensity band containing a first plurality of pixels, wherein the pixels within the band correspond to highlight areas of the image frame;

determining for at least one of the secondary colours, from the highlight areas, a second peak intensity band containing a second plurality of pixels; and comparing the first peak intensity band determined for the highlight colour with the second peak intensity band determined for said at least one secondary colour and altering a gain of the respective secondary colour channel to reduce an intensity difference between the first and second peak intensity bands.

2. A method according to claim 1 and including the step of defining for each colour channel a plurality of intensity bands, at least one of the plurality of intensity bands containing above a threshold number of pixels, wherein the steps of determining the first and second peak intensity bands for the highlight colour and said at least one secondary colour each comprises assigning each pixel of the image frame, or of said highlight areas, to a corresponding one of the plurality of intensity bands and identifying as a peak band the band which contains above the threshold number of pixels and is higher than any other band which also contains above said threshold number of pixels.

3. A method according to claim 2, wherein the step of defining the plurality of intensity bands for each colour channel comprises storing a plurality of threshold intensity levels, and the steps of assigning pixels to the plurality of intensity bands includes comparing pixel intensities for each colour with the threshold intensity levels.

4. A method according to claim 1 wherein peak intensity bands for both of the secondary colour channels are determined and said step of comparing is carried out for each of the secondary colours to reduce the intensity difference between the second peak intensity band and the first peak intensity band for the highlight colour.

5. A method according to claim 1, wherein the step of altering the gain of said secondary colour channel comprises reducing the gain of the secondary colour channel if the corresponding peak intensity band is greater than the corresponding peak intensity band for the highlight colour.

6. A method according to claim 5 and comprising the steps of:

determining the second peak intensity band for at least one of the secondary colours from substantially all the pixels in the image frame;

if the second peak intensity band for the highlight areas is less than the first peak intensity band for the highlight colour, then comparing the second peak intensity band for the whole image frame with the first peak intensity band for the highlight colour; and if the second peak intensity band for the whole image frame is less than the first peak intensity band for the highlight colour, then increasing the gain of the corresponding secondary colour channel to reduce the intensity difference between the first and second peak intensity bands.

7. A method according to claim 1, wherein said highlight colour is green and said at least two secondary colours are blue and red.

8. A method according to claim 1 and including the step of limiting the maximum intensities of three colour channels to maintain said maximum intensities within a predetermined linear range.

9. A method according to claim 8, wherein said maximum intensities of the three colour channels are limited by controlling exposure time of an image capture device which captures the image frame.

10. A method according to claim 9, wherein, for each colour, if the number of pixels having an intensity above a first threshold intensity $T_1$ exceeds a first threshold number, the exposure time is decreased whilst, if the number of pixels having an intensity between a second threshold intensity $T_2$ and said first threshold intensity, where $T_2 < T_1$ is below a second threshold number, the exposure time is increased.

11. A colour balance controller for controlling the colour balance of a colour video signal output by an image sensor corresponding to a video image frame defined by an array of pixels, the controller comprising:

An input for receiving at least three colour channels of the colour video signal, the channels including a highlight colour channel for a highlight colour and at least two secondary colour channels for secondary colours;

means for defining a plurality of pixel intensity bands for the signal on each colour channel;

first assignment means for assigning each pixel of the image frame into one of said bands according to the intensity of the highlight colour;

means for determining for the highlight colour a first peak intensity band containing a first plurality of pixels, wherein the pixels within the first peak intensity band correspond to highlight areas of the image frame;

second assignment means for assigning said first plurality of pixels within the highlight colour first peak intensity band into respective intensity bands according to the intensity of a first of the secondary colours;

means for determining for the first of the secondary colours a peak intensity band containing a second plurality of pixels; and comparator means coupled to the determining means for comparing the highlight colour first peak intensity band and the secondary colour peak intensity band; and gain control means for adjusting automatically a gain of one of said secondary colour channels in dependence upon the result of the comparison so as to reduce an intensity difference between the highlight colour first peak intensity band and the secondary colour peak intensity band.

12. A controller according to claim 11 and including;

third assignment means for assigning pixels within the highlight colour first peak intensity band into ones of said defined bands according to the intensity of a second one of said secondary colours; and means for determining for the second secondary colour a peak intensity band containing a plurality of pixels, wherein the comparator means is arranged to compare the highlight colour first peak intensity band and the second secondary colour peak intensity band and wherein the gain control means is arranged to adjust a gain of a second of said secondary colour channels in dependence upon the comparison of said colour peak intensity bands to reduce an intensity difference between the highlight colour first peak intensity band and the second secondary colour peak intensity band.

13. A controller according to claim 12 and comprising means for identifying peak intensity bands for each of the secondary colours across substantially an entire image frame wherein the comparator means is arranged to compare the intensity level band of said peak intensity bands against the first peak intensity band of the highlight colour, and the gain control means is arranged to vary the gain of the secondary colour channels in dependence upon the result of the comparison of the peak intensity bands to reduce intensity differences between the highlight colour peak intensity band and the secondary colour peak intensity bands for the entire image frame.

14. A controller according to claim 11, wherein the defining means comprises a plurality of intensity levels stored or generated in digital or analogue form.

15. A controller according to claim 14, wherein each of the first, second and third assignment means includes a plurality of comparators for comparing the intensity of each pixel against said plurality of stored intensity levels.

16. A video appliance having a colour balance controller according to any one of the claims 11 to 15.

17. A method of controlling the colour balance of a composite colour video image having at least three colour channels with a first colour characteristic of typical highlight areas, and at least two secondary colours, said method comprising the steps of:

monitoring output of individual colour channels of an image sensor;

recording a highlight colour peak signal level (Gpw) of a highlight colour peak band containing the output of at least several pixels;

recording for at least one of the secondary colours the peak signal levels (Rp and/or Bp) of secondary colour peak bands, each containing the output of at least several peaks, within image highlight areas having highlight colour signal levels corresponding substantially to said recorded highlight colour peak signal level;

comparing the recorded highlight secondary peak signal level(s) with the recorded highlight colour peak signal level and altering corresponding channel gain(s) so as to reduce any difference between highlight area secondary colour peak signal level(s) and the recorded highlight colour peak signal level.

18. A method of controlling the colour balance of a composite colour video image having at least three colour channels with a first colour characteristic of typical highlight areas, and at least two secondary colours, said method comprising the steps of:

monitoring output of individual colour channels of an image sensor;

recording the highlight colour peak signal level (Gpw) of a highlight colour peak band containing the output of at least several pixels;

recording first secondary colour peak signal levels (Rp, Bp) of respective secondary colour peak bands, each containing the output of at least several pixels, within image areas having highlight colour signal levels corresponding substantially to said recorded highlight colour peak signal level;

recording second whole image secondary colour peak signal levels (Rpw, Bpw) of respective secondary colour peak bands each containing the output of at least several pixels, across substantially the whole image;

comparing the recorded first secondary colour peak signal levels within the recorded highlight colour peak signal level and, in the case of the first secondary colour peak signal levels greater than the recorded highlight colour peak signal level, decreasing the respective channel gains substantially to the recorded highlight color peak signal level or, in the case of the first secondary colour peak signal levels less than the recorded highlight colour peak signal level, comparing the recorded second whole image secondary colour peak signal levels with the recorded highlight colour peak signal level and increasing the respective channel gains substantially to the recorded highlight colour peak signal level in the case of the second whole image secondary colour peak signal levels less than the recorded highlight colour peak signal level.

19. A colour balance controller suitable for use in controlling the colour balance of colour video systems in real time, which controller comprises:

monitoring means formed and arranged for monitoring the output signal levels of individual colour channels of an image sensor in use of the image sensor;

first temporary data storage means for recording a highlight colour peak signal level of a highlight colour peak band containing the output of at least several pixels;

secondary temporary data storage means for recording first, highlight area, secondary colour peak signal levels of respective secondary colour peak bands each containing the output of at least several pixels, within image areas having highlight colour signal levels corresponding substantially to said recorded highlight colour peak signal level;

third temporary data storage means for recording second, whole image, secondary colour peak signal levels of respective secondary colour peak bands each containing the output of at least several pixels, across substantially a whole image; and processor means formed and arranged for comparing the recorded first, highlight area, secondary colour peak signal levels with the recorded highlight colour peak signal level and providing gain control signals for decreasing respective channel gains in the case of the first highlight area secondary colour peak signal levels greater than the recorded highlight colour peak signal level, substantially to the recorded highlight colour peak signal level and, in the case of the first highlight area secondary colour peak signal levels less than the recorded highlight peak signal level, comparing the recorded second, whole image, secondary colour peak signal levels with the recorded highlight colour peak signal level and providing gain control signals for increasing respective channel gains in the case of the second, whole image, secondary colour peak signal levels less than the recorded highlight colour peak signal level, substantially to the recorded highlight colour peak signal level.

* * * * *

UNITED STATES PATENT AND TRADEMARK OFFICE
CERTIFICATE OF CORRECTION

PATENT NO. : 5,504,524

DATED : April 2, 1996

INVENTOR(S) : Mingying Lu and Peter B. Denyer

It is certified that error appears in the above-identified patent and that said Letters Patent is hereby corrected as shown below:

ON THE COVER PAGE:

In the title and column 1, "COLOR" should be -- COLOUR --.

Insert before item [56] item [30] Foreign Application Priority Data
--Oct. 15, 1993 United Kingdom  93 21334.6 --.

U.S. References, line 2, "Kondo" should be -- Kondo et al --.

Foreign References, column 2, line 2, "2194792" should be -- 2-194792 --.

Column 2, line 37, "vide" should be -- video --.

Column 4, line 7, "controllers" should be -- controller --.

Column 5, line 7, "secondary" should be -- second --.

Column 7, lines 17-18, "electro-mechanical" should be -- electromechanical --.

Column 7, line 50, after "lying" insert -- in --.

UNITED STATES PATENT AND TRADEMARK OFFICE
CERTIFICATE OF CORRECTION

PATENT NO. : 5,504,524
DATED : April 2, 1996
INVENTOR(S) : Mingying Lu and Peter B. Denyer It is certified that error appears in the above-identified patent and that said Letters Patent is hereby corrected as shown below:

Column 7, line 51, "highlights" should be -- highlight --.

Column 8, line 24, "operation" should be -- operating --.

Column 9, line 8, "umber" should be -- number --.

Column 11, line 45, "peaks" should be -- pixels --.

Column 12, line 10, "within" should be -- with --.

Column 12, line 35, "secondary" should be -- second --.

Signed and Sealed this

Thirteenth Day of August, 1996

Attest:

BRUCE LEHMAN

Attesting Officer

Commissioner of Patents and Trademarks